Oct. 18, 1927.
G. FRITZ
REAMER
Filed Oct. 20, 1925
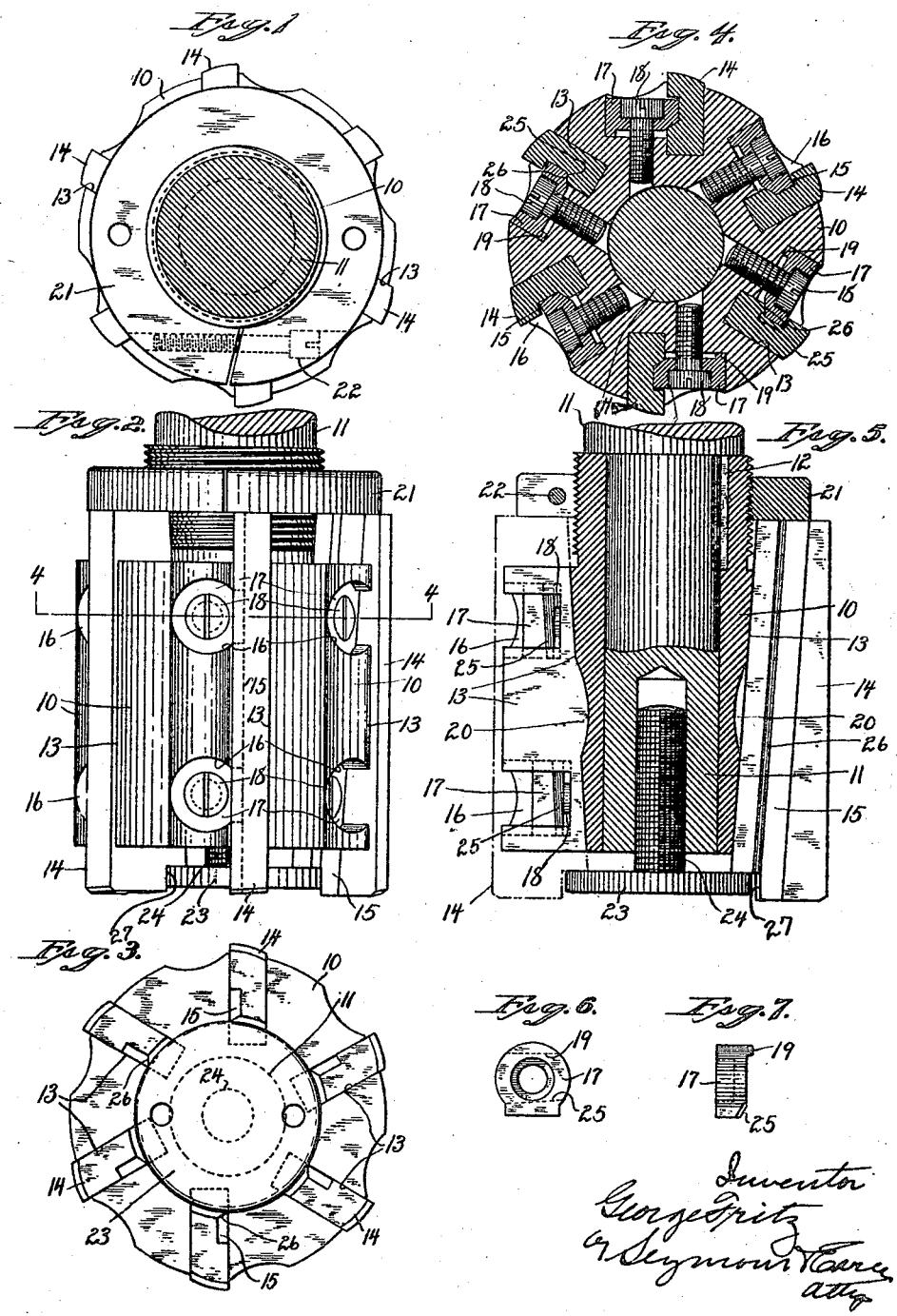

Patented Oct. 18, 1927.

1,645,696

UNITED STATES PATENT OFFICE.

GEORGE FRITZ, OF WATERBURY, CONNECTICUT.

REAMER.

Application filed October 20, 1925. Serial No. 63,604.

The drawings constitute part of this application, and represent in—

Fig. 1 a rear view of a reamer constructed in accordance with my invention.

Fig. 2 a plan view thereof.

Fig. 3 a front view thereof.

Fig. 4 a sectional view on the line 4—4 of Fig. 2.

Fig. 5 a longitudinal, sectional view of the same.

Fig. 6 a plan view of one of the cutter locking-blocks, detached.

Fig. 7 a side view of the same.

This invention relates to improvement in reamers, and particularly to reamers in which the cutters are adjusted radially by moving them longitudinally over a tapered surface, the object of the invention being to provide a reamer by which the cutting blades may be radially adjusted, but when adjusted, firmly held in position, and means whereby all of the cutters will be uniformly moved so as to properly position the cutters and keep the threads thereof in proper alignment, and so avoid the necessity of re-grinding to overcome misplacement, and the invention consists in the construction as hereinafter described and particularly recited in the claims.

In carrying out my invention, I employ a tubular body 10, longitudinally movable upon a shouldered shank 11, which is adapted to be mounted in a lathe or other reamer-holder, the body being longitudinally movable on said shank, but held against rotation thereon by a key 12. The body is formed with a series of radial cutter-grooves 13, the bottoms of which are preferably inclined from rear to front for the reception and support of cutters 14, which are formed in one side with channels 15 extending from end to end and formed at their bottoms with bevels 26. The inner ends of the cutters are cut away at their outer ends to form shoulders 27. Adjacent to the cutter-grooves 13 are pockets 16 for the reception of locking-blocks 17 which closely fit the pockets and extend at one side into the channels 15 and are held in place by screws 18 extending through them into the body, the blocks being recessed to receive the heads of the screws, and furnished on their inner faces with short lugs 19, on which the blocks may rock operate the lugs 19 with beveled edges 25, so that as the screws are turned in the blocks, the blocks will not only crowd the cutters inward, but against the walls of their grooves, so that they will be firmly locked in position. Preferably, the bottoms of the grooves 13 will be formed with notches 20, so as to provide bearings at front and rear thereof for the lower edges of the cutters. The inner ends of the cutter abut against an adjustable lock-nut 21, which, when adjusted on the body, may be locked in place by a locking-screw 22. The cutters are held against outward movement by the head 23 of a screw 24, which is turned into a longitudinal, centrally-arranged bore formed for it in the outer end of the shank 11. This screw not only holds the cutters in place, but also holds the body against longitudinal movement on the shank.

In adjusting, the cutters are moved back or forth so as to project to the desired extent radially beyond the body, and when so adjusted, the nut 21 is turned up against them and locked in position, thus forming a solid abutment at the rear. The screw 24 is then turned into place, and this screw engages with the outer ends of the cutters or the shoulders 27 thereof and forces them rearward against the nut 21, and when thus adjusted, the screws 18 are turned into place, thereby not only crowding the cutters downward into their grooves, but also forcing them against the walls of the grooves so that they cannot possibly move radially with respect to the body, and thus avoid chattering. By cutting away or notching the outer ends of the cutters, the head 23 of the screw 24 is seated within the outer ends of the cutters, so as not to interfere with the movement of the cutters to the bottom of the hole being cut.

By forming the cutters with channels extending from end to end, the cutters may be entirely removed by loosening the screws 18 but without removing the blocks 17.

I thus provide, in a very simple way, means for positively holding the cutters of a reamer in various positions of adjustment and assuring the proper alignment of the cutting-threads.

I claim:

1. An adjustable reamer, comprising a hollow body provided with longitudinal grooves in its outer periphery, blades for the said grooves, a blade-abutment mounted upon the said body at the inner end thereof for co-action with the inner ends of the said blades, a separately-formed shank extending into the said hollow body, a threaded bore formed in the other end of the said shank, and a locking-screw entering the said threaded bore and having a head adapted to engage the outer ends of the said blades for holding them in place against the said abutment and also acting through the said blades and blade-abutment to hold the said hollow body against outward axial displacement with respect to the said shank.

2. An adjustable reamer, comprising a hollow body provided with longitudinal grooves in its outer periphery, a plurality of substantially-cylindrical recesses also formed in the said body adjacent to and intersecting each of the said grooves, tapered blades for the said grooves, each of which is formed with a longitudinal channel intersecting its inner and narrowest end and having a beveled inner wall; centrally-perforated clamping-blocks installed in the said recesses and each formed at one side with a beveled extension for co-action with the beveled inner walls of the said channels and upon the inner face of its diametrically-opposite side with a fulcrum-lug; clamping-screws extending through the said perforated clamping-blocks and the said recesses and into the said hollow body for causing the beveled extensions of the said blocks to crowd the said blades against the opposite side and the bottom of the aforementioned grooves, and for causing the said fulcrum-lugs to engage the bottoms of the said recesses, and the side of the said block adjacent to the said fulcrum-lug, to engage the walls of the said recesses; a separately-formed shank extending into the aforementioned hollow body; a threaded bore formed in the outer end of the said shank; and a locking-screw entering the said threaded bore and having a head adapted to engage the outer ends of the said blades for holding them in place and also holding the said hollow body against outward axial displacement with respect to the said shank.

In testimony whereof, I have signed this specification.

GEORGE FRITZ.